Stillman & Taylor,
Pug Mill.

Nº 2,571.   Patented Apr. 21, 1842.

UNITED STATES PATENT OFFICE.

RICHARD STILLMAN, OF KENSINGTON, AND JESSE TAYLOR, OF SPRING GARDEN, PENNSYLVANIA.

MACHINE FOR TEMPERING CLAY FOR BRICKS.

Specification of Letters Patent No. 2,571, dated April 21, 1842.

*To all whom it may concern:*

Be it known that we, RICHARD STILLMAN, of Kensington, and JESSE TAYLOR, of Spring Garden, in the county of Philadelphia and State of Pennsylvania, have invented an Improvement in Apparatus for Tempering Clay for Making Bricks or for other Purposes; and we do hereby declare that the following is a full and exact description thereof.

The apparatus for tempering, or mixing, clay, which we have invented, consists of a wheel usually made of iron, which is to run in a circular trough, containing the clay to be mixed, or tempered; said wheel revolving on a horizontal shaft, connected at its inner end to a vertical post, or shaft, and having the horse, horses, or other animals by which it is to be drawn around, attached to its outer end. The tempering wheel that is placed upon the horizontal shaft is made to traverse back and forth upon said shaft, by means of a right and left handed screw cut upon it, the threads of one screw intersecting those of the other; there being, also, on the interior of the hub of the wheel, a swiveling guide piece, which alternately takes into the right and left handed threads, and thereby causes the tempering wheel to traverse back and forth along the horizontal shaft, by a self-adjusting action, while the horse, or other animal, continues to draw in one direction.

Figure 1:
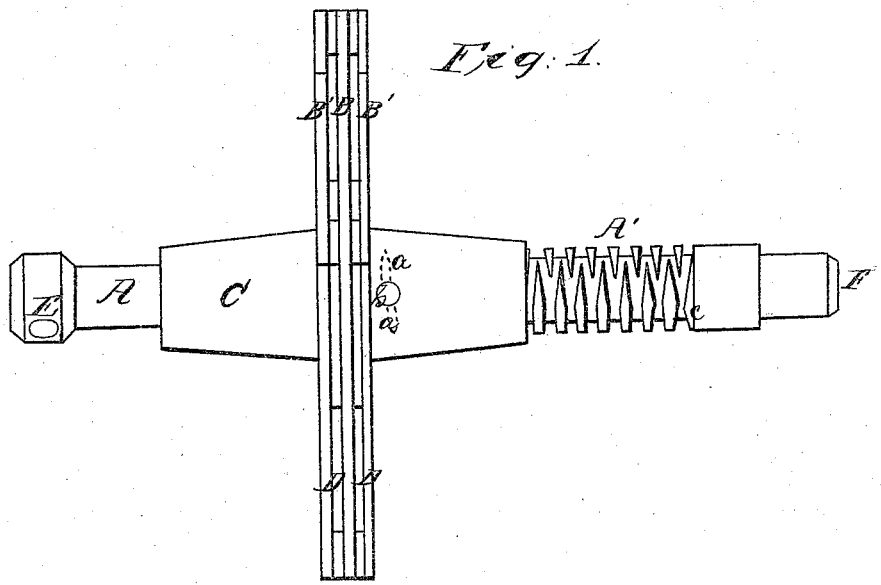
Figure 2:
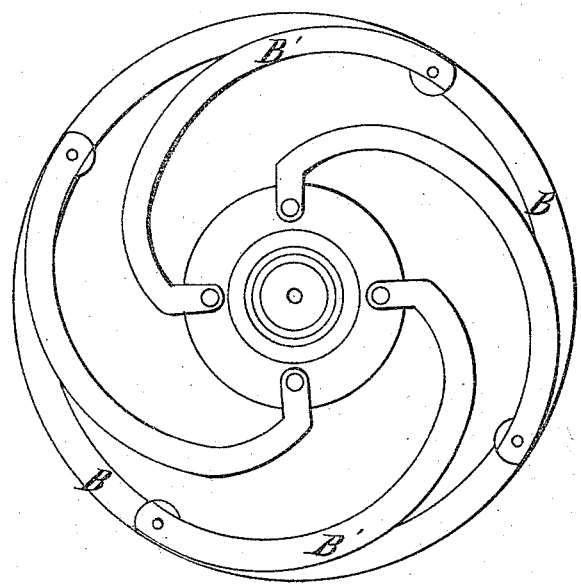
Figure 3:
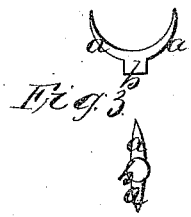

In the accompanying drawing, Figure 1, is a representation of the horizontal shaft, with the tempering wheel thereon; Fig. 2, is a side view of the tempering wheel; and Fig. 3, a top and side representation of swiveling guide piece.

A, A′, is the horizontal shaft, the part A′, showing the intersecting right and left handed screws; B, B′, the rim and spokes of the wheel, and C, its hub, which is tubular, and made sufficiently large within to enable it to pass freely over the shaft A. The rim B, of this wheel is attached to the hub C, by curved spokes B′, B′, which form cutting, or tempering, edges that gradually recede from the rim B, as shown in the drawing. Between these spokes and the rim, there is a space D, D, of one or two inches, more or less, through which the clay, as it is cut, may pass. The hole in the end E, of the shaft A, may be made to receive a gudgeon, or pin, on the upper end of a vertical post in the center of the trough, or it may be attached to a vertical shaft, in any convenient way. The outer end F, may have a wheel upon it, to run upon a circular way on the outside of the trough, should this be preferred, but the machine may be used without this device. The parts a, a, of the swiveling piece enter the threads of the screws A′, and it swivels on a cylindrical shank b, which fits into a hole drilled through the hub C. When the wheel has passed in one direction so far as to bring the piece a, to the termination of the screw part A′, one of the points of the piece a, is brought into contact with an inclined plane, as at c, which causes the piece a, to swivel around sufficiently far to guide it into the direction of, and to cause it to take into, the thread of the opposite screw. There may be two such wheels as that above described affixed to the same hub, should this be thought expedient; and when the apparatus is used for tempering potters', or other fine clays, the edges of the spokes may be made sharp, so as to constitute cutters.

We do not claim to be the first who have used a tempering wheel, or wheels, made to traverse back and forth on a horizontal shaft; but We do claim—

1. To have made a material improvement in the construction of this apparatus, by combining and arranging the respective parts thereof in the manner above described; that is to say, we claim the forming of the iron wheel B, B′, with curved spokes arranged in the manner represented in the accompanying drawing, and so attached to the hub, and to the rim, as to leave a space D, D, between them.

2. We also claim the manner of causing a wheel formed as herein described, to traverse back and forth on a horizontal shaft, by cutting intersecting right and left handed screws on said shaft, and employing a swivel piece a, b, within the hub of the wheel, to take alternately into the threads of said screws, in the manner set forth.

We do not claim the use of intersecting right and left handed screws, in their general application, but only in their combination with a wheel for tempering clay, constructed, and operating, as herein made known, and actuated by animal or other power.

RICHARD STILLMAN.
JESSE TAYLOR.

Witnesses:
JOHN JACKSON,
JACOB NEAFIE.